United States Patent [19]

Takahashi et al.

[11] Patent Number: 5,240,765
[45] Date of Patent: Aug. 31, 1993

[54] SILICONE RUBBER FILM - FORMING COMPOSITION AND SILICONE RUBBER FILM

[75] Inventors: Masaharu Takahashi; Kazuma Momii, both of Annaka, Japan

[73] Assignee: Shin-Etsu Chemical Co., Ltd., Tokyo, Japan

[21] Appl. No.: 910,897

[22] Filed: Jul. 10, 1992

[30] Foreign Application Priority Data

Jul. 10, 1991 [JP] Japan .................................. 3-195862

[51] Int. Cl.$^5$ .......................... B32B 7/00; C08K 5/23; C08J 9/08

[52] U.S. Cl. ..................................... 428/265; 428/220; 428/447; 521/89; 521/92; 521/94; 521/96; 521/154; 524/190; 524/715; 524/722; 524/726; 524/730; 524/731

[58] Field of Search ...................... 521/154, 94, 89, 96, 521/92; 428/265, 220, 447; 524/190, 722, 715, 726, 730, 731

[56] References Cited

U.S. PATENT DOCUMENTS

| | | | |
|---|---|---|---|
| 3,565,858 | 2/1971 | Knierge et al. | 528/21 |
| 4,490,488 | 12/1984 | Cush | 521/154 |
| 4,593,049 | 6/1986 | Bauman et al. | 521/154 |
| 4,980,384 | 12/1990 | Takahashi et al. | 521/154 |
| 5,019,295 | 5/1991 | Yoshida | 521/154 |
| 5,041,466 | 8/1991 | Takahashi et al. | 521/154 |
| 5,061,736 | 10/1991 | Takahashi et al. | 521/154 |
| 5,120,385 | 6/1992 | Takahashi et al. | 521/154 |

FOREIGN PATENT DOCUMENTS

| | | |
|---|---|---|
| 1577761 | 8/1969 | France . |
| 1591565 | 6/1970 | France . |
| 1240390 | 7/1971 | United Kingdom . |

OTHER PUBLICATIONS

Database WPIL AN-91-182394 (25).
Database WPIL AN-83-818073 (46).

*Primary Examiner*—Morton Foelak
*Attorney, Agent, or Firm*—Millen, White, Zelano, & Branigan

[57] ABSTRACT

A silicone rubber composition comprising an organopolysiloxane and a curing agent is improved by adding a foaming agent in an amount of 0.1 to 10 parts by weight per 100 parts by weight of the organopolysiloxane. The composition is heat curable into silicone rubber films or coatings which are substantially unfoamed and tack-free on a surface.

9 Claims, 1 Drawing Sheet

SILICONE RUBBER FILM - FORMING COMPOSITION AND SILICONE RUBBER FILM

This invention relates to a composition capable of forming substantially unfoamed silicone rubber film which is tack-free at a surface. It also relates to substantially unfoamed silicone rubber film obtained by curing the composition.

BACKGROUND OF THE INVENTION

In the prior art, silicone rubber film products including silicone rubber sheets of thin gage obtained by curing silicone rubber compositions alone and silicone rubber-coated fabrics obtained by applying and curing silicone rubber compositions onto a surface of woven fabrics and other substrates are used in a wide variety of fields, for example, as electrical insulators, diaphragms, sealants, air bags, tents, hoses, ground sheets, and clothes. These silicone rubber film products remain uniquely tacky on their surface even after vulcanization or curing and are thus susceptible to contamination due to dust or debris deposition or tend to adhere to each other if two sheets are overlapped or such a sheet is kept folded. Difficulty will arise when it is desired to separate the overlapped or folded portions.

One common practice for overcoming these problems is simply to apply dusting powder such as talc to silicon rubber film products on their surface. This adds to the complexity of the manufacturing process and scattering powder gives rise to an environmental or hygienic problem.

SUMMARY OF THE INVENTION

Therefore, an object of the present invention is to eliminate the above-mentioned problems such as powder scattering and to provide a silicone rubber composition capable of forming a substantially unfoamed silicone rubber film in a simple manner in manufacturing thin silicone rubber sheets and silicone rubber-coated fabrics.

Another object of the present invention is to provide a substantially unfoamed silicone rubber film which is tack-free on its surface.

According to the present invention, there is provided a silicone rubber composition capable of forming a substantially unfoamed, tack-free silicone rubber film, comprising (A) 100 parts by weight of an organopolysiloxane of the following average compositional formula:

$$R_a^1 SiO_{(4-a)/2} \tag{1}$$

wherein $R^1$ is independently selected from substituted or unsubstituted monovalent hydrocarbon groups and letter a is a positive number of 1.98 to 2.01, having a viscosity of at least 300 centistokes (cs) at 25° C., (B) 0.1 to 10 parts by weight of a foaming agent, and (C) a curing agent.

As used herein, the term "substantially unfoamed" means that no foam is perceivable on a film by visual observation. The term "film" refers to sheets of silicone rubber and coatings of silicone rubber on suitable supports.

The inventors have found that a silicone rubber composition comprising an organopolysiloxane of average compositional formula (1) having a viscosity of at least 300 centistokes at 25° C. and a curing agent is improved by adding a relatively small amount of a foaming agent thereto. By forming films of thin gage, typically 1 mm or less from the composition followed by heat curing, quite unexpectedly, cured silicone rubber films are obtained without foaming. The cured silicone rubber films are not only free of foam cells on visual observation, but also tack-free on their surface. The problems associated with the tack of prior art silicone rubber films are thus eliminated.

DETAILED DESCRIPTION OF THE INVENTION

Figure 1:
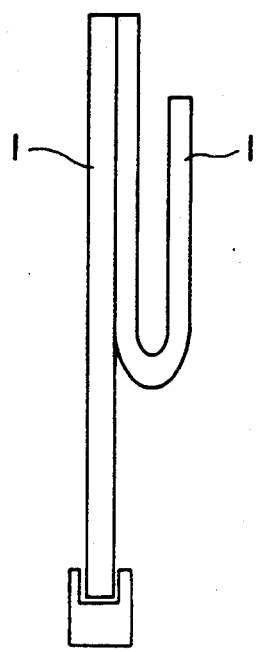
FIG. 1 schematically illustrates a surface tack test on silicone rubber sheets.

The silicone rubber film-forming composition of the present invention includes (A) an organopolysiloxane, (B) a foaming agent, and (C) a curing agent.

Organopolysiloxane (A) is of the following average compositional formula.

$$R_a^1 SiO_{(4-a)/2} \tag{1}$$

In formula (1), $R^1$ which may be identical or different is selected from substituted or unsubstituted monovalent hydrocarbon groups preferably having 1 to 12 carbon atoms, more preferably 1 to 6 carbon atoms. Examples of the monovalent hydrocarbon group include alkyl groups such as methyl, ethyl, propyl, butyl and hexyl groups; cycloalkyl groups such as a cyclohexyl group; alkenyl groups such as vinyl and allyl groups; aryl groups such as phenyl and tolyl groups; and substituted ones of these groups wherein some or all of the hydrogen atoms are replaced by halogen atoms, cyano groups or the like, such as chloromethyl, trifluoropropyl and cyanoethyl groups. Preferred groups represented by $R^1$ are methyl, ethyl, phenyl, γ-trifluoropropyl, cyanoethyl, vinyl, and allyl groups. Preferably $R^1$ contains at least 50 mol %, especially at least 80 mol % of a methyl group. Organopolysiloxanes with a methyl content of less than 50 mol % would somewhat lose the desirable properties inherent to methylpolysiloxane and be rather high in raw material cost. Letter a in formula (1) is a positive number of 1.98 to 2.01.

The organopolysiloxane should have a viscosity of at least 300 cs at 25° C., preferably from about $1 \times 10^4$ to about $10^8$ cs. With a viscosity of less than 300 cs, when the silicone rubber composition is shaped into a sheet or coated onto a substrate to form a film thereon, the resulting sheet or film has insufficient mechanical strength for practical application. Preferably the organopolysiloxane has a substantially linear structure and its molecular chain is end blocked with a silanol, methyl or vinyl group, more preferably with a trivinylsilyl group. Such organopolysiloxanes may be prepared by well-known methods, for example, by carrying out ring-opening polymerization of cyclic polysiloxanes which are well known oligomers in the presence of acid or alkali.

Chemically decomposing foaming agent (B) is selected from those which are commonly used in the manufacture of silicone rubber foams and which are stable at room temperature, but release a foaming gas such as nitrogen or carbon dioxide gas at elevated temperatures. Foaming agents include azobisisobutyronitrile, dinitropentamethylenetetramine, benzenesulfohydrazide, N,N'-dinitroso-N,N'-dimethylterephthalamide, and azodicarbonamide.

Foaming agent (B) is blended in an amount of 0.1 to 10 parts by weight, especially 2 to 6 parts by weight per 100 parts by weight of organopolysiloxane (A). Less than 0.1 part of the foaming agent is ineffective in improving the surface tack of the resulting silicone rubber film whereas more than 10 parts of the foaming agent cause the film to foam upon heat curing, developing voids, holes and cracks which are detrimental for products to perform their function.

Curing agent (C) is generally selected from organic peroxides. Examples of the organic peroxide include benzoyl peroxide, 2,4-dichlorobenzoyl peroxide, orthochlorobenzoyl peroxide, di-t-butyl peroxide, dicumyl peroxide, t-butyl perbenzoate, t-butyl peracetate, 2,5-dimethyl-2,5-di(t-butylperoxy)hexane, (t,-butylperoxy)-myristyl carbonate, and other well-known peroxides. The curing agent is preferably added in an amount of about 0.1 to 5 parts by weight per 100 parts by weight of organopolysiloxane (A) when it is an organic peroxide.

The silicone rubber film-forming composition may be of the addition reaction vulcanization type. In this embodiment, organopolysiloxane (A) contains an alkenyl group such as vinyl, and curing agent (C) is a combination of an organohydrogenpolysiloxane having at least three hydrogen atoms attached to a silicon atom (or at least three ≡SiH groups) in a molecule with a platinum catalyst. The organohydrogenpolysiloxane is preferably of the following formula (2)

$$R_b^2 H_c SiO_{(4-b-c)/2} \qquad (2)$$

In formula (2), $R^2$ is an alkyl group having 1 to 10, preferably 1 to 8 carbon atoms such as methyl, and letters b and c are positive numbers meeting $b+c=1$ to 3. This organohydrogenpolysiloxane is preferably added in such amounts as to provide about 0.5 to 5 mol of SiH group per mol of the alkenyl group in organopolysiloxane (A). The platinum catalyst may be selected from chloroplatinic acid, complex salts of chloroplatinic acid with olefins or vinylsiloxane, and alcohol solutions of chloroplatinic acid. The platinum catalyst is preferably added in such amount as to provide about 0.5 to 500 parts, especially about 2 to 200 parts by weight of platinum (Pt) per million parts by weight of organopolysiloxane (A).

The silicone rubber film-forming composition of the present invention may be obtained simply by mixing the above-mentioned components (A) to (C). Any of well-known additives which are commonly used with silicone rubber compositions of this type may be added to the silicone rubber film-forming composition of the present invention depending on its application or purpose. Such additives include silane coupling agents such as γ-glycidoxypropyltrimethoxysilane, γ-mercaptopropyltrimethoxysilane, γ-aminopropyltrimethoxysilane, vinyltrialkoxysilanes, etc., metal salts such as metal salts of organic carboxylic acids, heat resistance modifiers, flame retardants, and dispersants.

Moreover, fillers may be blended into the silicone rubber film-forming composition of the present invention for the purpose of increasing the viscosity of the composition thereby improving the workability of the composition upon coating, and improving the hardness, tensile strength, elongation and other physical properties of the cured product. The fillers may be blended in the form of fine particulates or fibers. Exemplary fillers include fumed silica, precipitated silica, ground quartz, diatomaceous earth, glass balloons, iron oxide, zinc oxide, titanium oxide, magnesium oxide, talc, aluminum silicate, alumina, calcium carbonate, carbon black, asbestos, glass fibers, carbon fibers, polyester fibers, polytetrafluoroethylene powder, and polyvinyl chloride powder. Other fillers which can be blended herein are resinous polysiloxanes which are copolymers of $R_3SiO_{1/2}$, $R_2SiO$, $RSiO_{3/2}$ and other optional units wherein R is a monovalent hydrocarbon group. Often the fillers are blended in amounts of about 20 to 200 parts, more preferably about 30 to 100 parts by weight per 100 parts by weight of organopolysiloxane (A). Some physical properties would be lost outside this range.

The silicone rubber film-forming composition of the present invention is coated to fabrics and other substrates preferably by dissolving it in a suitable organic solvent. Preferred organic solvents are benzene, toluene, xylene, hexane, heptane and kerosine. Preferably, 100 parts by weight of the composition is dissolved in about 10 to 1000 parts by weight, especially 100 to 300 parts by weight of the organic solvent.

The substrates or supports to which the silicone rubber composition of the invention is applicable include metals such as iron, aluminum, stainless steel, nickel, copper and chromium; ceramics such as glass, quartz and porcelain; plastics such as epoxy resins, acrylic resins, and polyethylene terephthalate resins; synthetic fibers or woven fabrics thereof such as nylon fibers, Tetron fibers, Vinylon fibers, polyester fibers, and polyurethane fibers; natural fibers or woven fabrics thereof; inorganic fibers or woven fabrics thereof such as glass fibers; natural rubber and various synthetic rubbers. In particular, since the silicone rubber composition of the invention well adheres to synthetic fibers and woven fabrics thereof, for example, such as nylon fibers, polyamide fibers, imide fibers as typified by KEVLAR fibers, and polyurethane fibers as typified by spandex, it is advantageously used in the manufacture of silicone rubber-coated fabrics useful as air bags or the like.

The silicone rubber film-forming composition of the present invention is cured to form a silicone rubber film in various ways. The composition may be preformed as by coating or calendering. It may be coated by knife coating, brushing, dipping or spraying techniques. If the composition is solid, it may be dissolved in an organic solvent as previously mentioned and coated to a suitable support by any coating technique such as knife coating, brushing, dipping or spraying technique. In any case, the composition is then cured by selecting appropriate conditions depending on a particular curing mechanism of the composition. For a system using organic peroxides as the curing agent, the composition may be vulcanized with hot air at about 150° to 550° C. for several seconds to about 20 minutes or compression molded at about 110° to 180° C. for about 3 to 15 minutes. For an addition reaction curing system using organohydrogenpolysiloxane combined with a platinum catalyst as the curing agent, the composition may be vulcanized with hot air at about 100° to 400° C. for several seconds to less than 20 minutes or transfer molded or compression molded at about 100° to 200° C. for about 30 seconds to 10 minutes.

In this way, there are formed silicone rubber films and coatings. These films and coatings remain unfoamed and tack-free on a surface thereof when they are about 10 μm to about 1 mm thick, especially when they are about 30 to about 200 μm thick. These benefits would become less outstanding with films and coating of thinner than 10 μm whereas foam cells are sometimes introduced with films and coatings of thicker than 1 mm.

The thus produced silicone rubber films and coatings are useful in a wide variety of fields, for example, as sealants, covers, packaging materials, silicone rubber coating materials, electrical insulators, diaphragms, seals, air bags, tents, ducts or hoses, medical materials, and clothes.

EXAMPLE

Examples of the present invention are given below together with Comparative Examples by way of illustration and not by way of limitation. All parts are by weight. In the examples, the viscosity was measured at 25° C. and the bonding force was measured according to the method of JIS K-6301.

EXAMPLES 1 and COMPARATIVE EXAMPLE 1

To 100 parts of methylvinylpolysiloxane comprised of 99.8 mol % of dimethylsiloxane units and 0.2 mol % of vinylmethylsiloxane units and having a viscosity of 5,000,000 cs were added 40 parts of hydrophobic fumed silica surface treated with a trimethylsilyl group and having a specific surface area of 200 m$^2$/g and 2 parts of α,ω-dimethylpolysiloxane diol having a viscosity of 20 cs. The mixture was uniformly kneaded in a kneader mixer and heat treated at 160° C. for 2 hours, obtaining Compound A.

To 100 parts of Compound A were added 4 parts of azodicarbonamide (Cellmike CAP-250, manufactured by Sankyo Kasei K.K) as a foaming agent and 1.2 parts of 50% purity organic peroxide, 2,4-dichlorobenzoyl peroxide as a curing agent. The mixture was uniformly milled using a twin roll mill. It was press cured at 120° C. and 20 kg for 10 minutes, obtaining a sheet of 0.5 mm thick (Example 1).

For comparison purposes, a sheet of 0.5 mm thick (Comparative Example 1) was prepared by the same procedure as above except that no azodicarbonamide was added to Compound A.

For each of the silicone rubber sheets, as seen from FIG. 1, a pair of sheet sections 1 were laid one on another, placed under a pressure of 20 kgf/cm$^2$ for 12 hours for pressure bonding, and then cut to a test specimen with a width of 2.5 cm. Using a tensile tester, a 180° peel test was carried out by pulling one section 1 in a direction of 180° with respect to the other section 1 at a rate of 500 mm/min. as shown in FIG. 1. The pulling load is a measure of the surface tack of the cured silicone rubber sheet. The results are shown in Table 1. For both the sheets, no foam cells were observed to naked eyes.

TABLE 1

|  | Example 1 | Comparative Example 1 |
| --- | --- | --- |
| Foaming agent | azodicarbonamide | none |
| Surface tack (g/2.5 cm wide) | 100 | 350 |

EXAMPLES 2,3 AND COMPARATIVE EXAMPLES 2-6

Some compositions were prepared from Compound A of Example 1 by adding thereto azodicarbonamide (Cellmike CAP-250) as a foaming agent in amounts of 0.08 parts (Comparative Example 2), 5 parts (Example 2), and 12 parts (Comparative Example 3). Some compositions were similarly prepared from Compound A of Example 1 by adding thereto azobisisobutyronitrile as a foaming agent in amounts of 0.1 parts (Comparative Example 4), 5 parts (Example 3), and 12 parts (Comparative Example 5). To each of these compositions was added 1.2 parts of 50% purity organic peroxide, 2,4-dichlorobenzoyl peroxide as a curing agent as in Example 1. In accordance with the procedure of Example 1, sheets of 0.5 mm thick were prepared from these compositions. A sheet was prepared by the same procedure as in Example 1 except that the sheet was 1.1 mm thick (Comparative Example 6).

The surface appearance of these sheets was evaluated by visual observation and the surface tack thereof was measured by the same procedure as in Example 1. The results are shown in Table 2.

TABLE 2

|  |  | Example | | Comparative Example | | | | |
| --- | --- | --- | --- | --- | --- | --- | --- | --- |
|  |  | 2 | 3 | 2 | 3 | 4 | 5 | 6 |
| Foaming agent | Type | ADA | ABN | ADA | ADA | ABN | ABN | ADA |
|  | Amount* | 5 | 5 | 0.08 | 12 | 0.08 | 12 | 5 |
| Sheet gage (mm) |  | 0.5 | 0.5 | 0.5 | 0.5 | 0.5 | 0.5 | 1.1 |
| Sheet appearance (visual observation) |  | unfoamed | unfoamed | unfoamed | surface foamed, cracked | unfoamed | surface foamed, cracked | surface foamed, cracked |
| Surface tack (g/2.5 cm wide) |  | 80 | 95 | 340 | UM | 345 | UM | UM |

*parts by weight per 100 parts by weight of methylvinylpolysiloxane
Note:
ADA: azodicarbonamide
ABN: azobisisobutyronitrile
UM: unmeasurable

EXAMPLE 4

To Compound A of Example 1 were added 5 parts of azodicarbonamide (Cellmike CAP-250) as a foaming agent and 3.5 parts of 50% purity organic peroxide, 2,4-dichlorobenzoyl peroxide as a curing agent. The mixture was uniformly milled and sheeted using a three roll mill. The sheeted blend was dissolved in toluene to form a toluene solution containing 25% by weight of the silicone value (Example 4).

For comparison purposes, a toluene solution was similarly prepared except that no azodicarbonamide was added (Comparative Example 7).

Each of the solutions was applied to one surface of a nylon fiber plain weave fabric having a density of 18×17 strands/25 mm to a thickness of 70 μm (on drying), dried with air at 25° C. for 30 minutes, and vulcanized by heating at 180° C. for 7 minutes.

Figure 2:
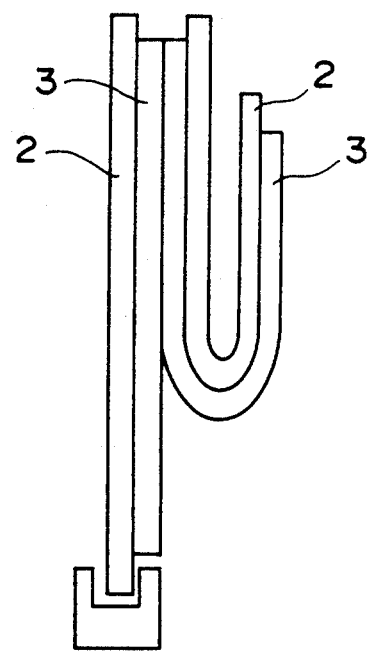
FIG. 2 schematically illustrates a surface tack test on silicone rubber-coated fabrics.

For each of the coated fabrics, as seen from FIG. 2, a pair of coated fabric sections were closely attached such that the silicone rubber coating sections 3 faced each other while the nylon fabric sections 2 were outside. The subsequent procedure for determining the surface tack of the cured coating was the same as in Example 1. The results are shown in Table 3. For both the sheets, no foam cells were observed to naked eyes.

TABLE 3

|  | Example 4 | Comparative Example 7 |
|---|---|---|
| Foaming agent | azodicarbonamide | none |
| Surface tack (g/2.5 cm wide) | 50 | 200 |

The silicone rubber composition of the present invention is heat curable into films, sheets or coatings which are tack-free on a surface and substantially unfoamed despite of the inclusion of a foaming agent. Since the films or coating require no application of dusting powder, the invention simplifies the silicone rubber film or coating manufacturing process and eliminates the problems of conventional silicone rubber films or coatings including an environmental or hygienic problem associating with dusting powder, deposition of contaminants and debris, and fusion and adhesion of doubled or folded films or coatings. Even after the silicone rubber sheet is kept folded for an extended time, the folded portions can be smoothly separated without local fusion. Such sheets are especially suited for air bags or the like.

Although some preferred embodiments have been described, many modifications and variations may be made thereto in the light of the above teachings. It is therefore to be understood that within the scope of the appended claims, the invention may be practiced otherwise than as specifically described.

We claim:

1. A substantially unfoamed silicone rubber film obtained by curing a silicone rubber composition comprising (A) 100 parts by weight of an organopolysiloxane of the following average compositional formula:

$$R_a^1 SiO_{(4-a)/2} \quad (1)$$

wherein $R^1$ independently selected from substituted or unsubstituted monovalent hydrocarbon groups and letter a is a positive number of 1.98 to 2.01 having a viscosity of at least 100 centistokes at 25° C.

(B) 0.1 to 10 parts by weight of a chemically decomposing foaming agent, and (C) a curing agent, said silicone rubber film having a thickness of about 10 μm to about 1 mm and being free of foam cells on unaided visual observation.

2. The substantially unfoamed silicone rubber film of claim 1, which has a thickness of 30 μm to 200 μm.

3. The substantially unfoamed silicone rubber film of claim 1, wherein in formula (1), the hydrocarbon groups represented by $R^1$ have 1 to 12 carbon atoms.

4. The substantially unfoamed silicone rubber film of claim 1, wherein $R^1$ is selected from the group consisting of methyl, ethyl, phenyl, γ-trifluoropropyl, cyanoethyl, vinyl, and allyl groups.

5. The substantially unfoamed silicone rubber film of claim 1, wherein $R^1$ contains at least 50 mol % of methyl groups.

6. The substantially unfoamed silicone rubber film of claim 1, wherein the foaming agent is stable at room temperature, but releases a foaming gas at elevated temperatures.

7. The substantially unfoamed silicone rubber film of claim 6, wherein the foaming agent is selected from the group consisting of azobisisobutyronitrile, dinitropentamethylenetetramine, benzenesulfohydrazide, N,N'-dinitroso-N,N'-dimethylterephthalamide, and azodicarbonamide.

8. The substantially unfoamed silicone rubber film of claim 1, wherein the curing agent is an organic peroxide.

9. The substantially unfoamed silicone rubber film of claim 1, wherein the curing agent is an organohydrogenpolysiloxane combined with a platinum catalyst.

* * * * *